(12) United States Patent
Ogami

(10) Patent No.: US 6,522,686 B1
(45) Date of Patent: Feb. 18, 2003

(54) RECEIVING APPARATUS OF SPECTRUM SPREAD COMMUNICATION SYSTEM

(75) Inventor: Tadashi Ogami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/538,514

(22) Filed: Mar. 30, 2000

(30) Foreign Application Priority Data

Mar. 31, 1999 (JP) ............................................. 11-090901

(51) Int. Cl.[7] ............................. H04B 1/69; H04B 7/216
(52) U.S. Cl. ...................... 375/149; 375/130; 370/342
(58) Field of Search ................................. 375/149, 147, 375/148, 144, 130, 347, 316; 455/504, 500, 277.1, 277.2, 304, 303; 370/342, 350, 320, 335

(56) References Cited

U.S. PATENT DOCUMENTS

| | | | | |
|---|---|---|---|---|
| 5,548,836 A | * | 8/1996 | Taromaru | 455/272 |
| 5,710,995 A | * | 1/1998 | Akaiwa et al. | 375/347 |
| 5,844,935 A | | 12/1998 | Shoji | 375/200 |
| 6,028,894 A | | 2/2000 | Oishi et al. | 375/227 |
| 6,259,721 B1 | * | 7/2001 | Uesugi et al. | 370/335 |
| 6,359,864 B1 | * | 3/2002 | Yoshida et al. | 370/318 |

FOREIGN PATENT DOCUMENTS

| | | |
|---|---|---|
| JP | 5-37490 | 2/1993 |
| JP | 9-135193 | 5/1997 |
| JP | 10-190497 | 7/1998 |
| JP | 10-336150 | 12/1998 |
| JP | 2000-4191 | 1/2000 |
| JP | 2000-59267 | 2/2000 |

* cited by examiner

Primary Examiner—Chi Pham
Assistant Examiner—Khai Tran
(74) Attorney, Agent, or Firm—Foley & Lardner

(57) ABSTRACT

A receiving apparatus of spectrum spread communication system, which has optimum detection characteristics for receiving signals irrespectively of various fading pitches in fading environment, is realized. In a receiving apparatus used in a code division multiple access system, two types of detection circuits are provided, one detection circuit having optimum detection characteristics under low speed fading environment and another detection circuit having optimum detection characteristics under high speed fading environment, and an output signal having better detection result of one of detection circuits is determined by a detection output selection circuit. The output of determined detection circuit is selected by a selector as an output signal of this receiving apparatus.

10 Claims, 7 Drawing Sheets

RECEIVING APPARATUS OF SPECTRUM SPREAD COMMUNICATION SYSTEM

BACKGROUND OF THE INVENTION

1. Field of the Invention

The present invention relates to a receiving apparatus of spectrum spread communication system used in a code division multiple access system (CDMA).

2. Description of the Related Art

A receiving apparatus of spectrum spread communication system is used in a code division multiple access system (CDMA) mainly employed in a mobile communication system. FIG. 7 is a block diagram showing a conventional receiving apparatus of spectrum spread communication system. The receiving apparatus of spectrum spread communication system shown in FIG. 7 comprises a synchronism establishing circuit 101, a data buffer 102, a correlator 103 for de-spreading reception data using a transmission spread code based on a synchronization signal and a pilot interpolation detection circuit 104 for detecting a correlator output.

The conventional receiving apparatus of spectrum spread communication system stated as above, however, has only one type of pilot interpolation detection circuit. Due to this, the receiving apparatus has problems that it is difficult to constantly obtain good reception characteristics with respect to varying fading environments and that the receiving apparatus is lacking in follow-up characteristics with respect to the varying fading environments.

SUMMARY OF THE INVENTION

The object of the present invention is to provide a receiving apparatus of spectrum spread communication system realizing optimum detection characteristics irrespectively of fading pitches when a signal is received in fading environment.

A receiving apparatus of spectrum spread communication system according to the present invention comprises a plurality of detection circuits, each has optimum detection characteristics of receiving signals under different fading pitches, a detection output selection circuit, which determines one of detection circuits performing better detection result than others, and a selector, which selects output signals from the detection circuit determined by the detection output selection circuit as output signals of the receiving apparatus.

In more detail, a receiving apparatus of spectrum spread communication system according to the present invention comprises the following elements:

(1) a synchronism establishment circuit, which correlates a series of input data to a series of signals obtained by spreading a series of synchronism establishment signals using a spread code, and outputs a synchronization signal;

(2) a data buffer, which stores the series of input data and outputs the input data synchronous with the synhchronization signal;

(3) a correlator, which performs a correlation calculation between a reception signal from the data buffer and the spread code synchronously with the synchronization signal, and outputs a correlation value;

(4) a plurality of detection circuits, each has optimum detection characteristics of receiving signals under different fading pitches, compensates receiving signals in consideration of a phase shift based on the correlation value and the synchronization signal, and outputs a judging signal indicating the detection result having being detected and detected signals as demodulation signals;

(5) a detection output selection circuit, which outputs a selection signal indicating one of the detection circuits performing better detection result than others by comparing the judging signal from each detection circuit; and (6) a selector, which selects demodulation signals from the detection circuit indicated by the selection signal, and outputs the demodulation signals as output signals of the receiving apparatus.

The judging signal described above can be a ratio of average power to noise power of the phase shift estimated vector per one symbol of the series of synchronism establishment signals.

When two detection circuits are provided, one detection circuit has optimum detection characteristics of receiving signals under a low speed fading pitch, and another detection circuit has optimum detection characteristics of receiving signals under a high speed fading pitch.

In another aspect, a receiving apparatus of spectrum spread communication system according to the present invention comprises the following elements:

(1) a synchronism establishment circuit, which correlates a series of input data to a series of signals obtained by spreading a series of synchronism establishment signals using a spread code, and outputs a synchronization signal;

(2) a data buffer, which stores the series of input data and outputs the input data synchronous with the synchronization signal;

(3) a correlator, which performs a correlation calculation between a reception signal from the data buffer and the spread code synchronously with the synchronization signal, and outputs a correlation value;

(4) a plurality of phase shift vector generating sections, each has optimum calculation characteristics of receiving signals under different fading pitches, calculates a phase shift vector of receiving signals based on the correlation value and the synchronization signal, and outputs the calculated phase shift vector of receiving signals and a judging signal indicating a ratio of average power to noise power of the phase shift estimated vector per one symbol of the series of synchronism establishment signals;

(5) a detection output selection circuit, which outputs a selection signal indicating one of the phase shift vector generating sections being considered obtaining a better result of calculation than others by comparing the judging signal from each phase shift vector generating section; and (6) a detection circuit, which selects the phase shift vector of receiving signals from the phase shift vector generating section indicated by the selection signal, performs detection operation of receiving signals by using the phase shift vector of receiving signals and the synchronization signal, and outputs signals being detected as output signals of the receiving apparatus.

DETAILED DESCRIPTION OF PREFERRED EMBODIMENTS

Next, the embodiments of the present invention will be described with reference to the drawings.

Figure 1:
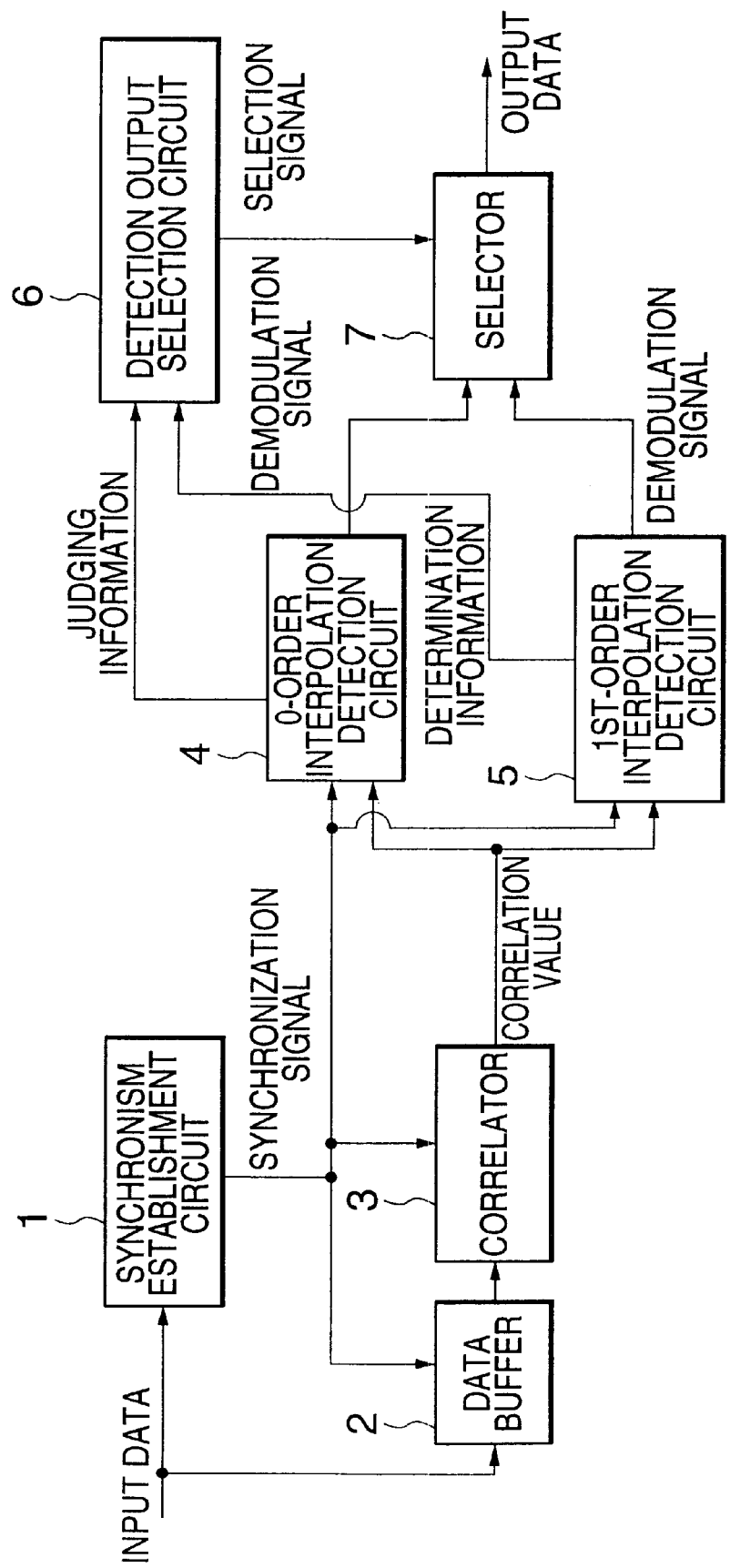
FIG. 1 is a block diagram showing an embodiment of a receiving apparatus of spectrum spread communication system according to the present invention.

FIG. 1 is a block diagram showing an embodiment of a receiving apparatus of spectrum spread communication system according to the present invention. The receiving apparatus of spectrum spread communication system shown in FIG. 1 comprises a synchronism establishment circuit 1, a data buffer 2, a correlator 3, detection circuits 4, 5 which have different detection characteristics each other for obtaining different detection result at different fading pitches, a detection output selection circuit 6 for determining a better output from one of the detection circuits 4, 5 and providing a selection signal, and a selector 7 for selecting an output from one of the detection circuits 4, 5 as an output data in accordance with the selection signal.

The synchronism establishment circuit 1 correlates a series of input data to a series of signals obtained by spreading a series of synchronism establishment signals inserted into reception signals using a spread code, and outputs synchronization signals to the data buffer 2, the correlator 3 and the detection circuits 4, 5.

The data buffer 2 once stores input data and outputs the input data being synchronous with the synchronization signal to the correlator 3, and the correlator 3 performs a calculation of the correlation between the reception signal and the spread code synchronously with the synchronization signal and outputs a correlation value to both of the detection circuits 4, 5.

The detection circuit 4 has optimum detection characteristics under a low speed fading environment and the detection circuit 5 has optimum detection characteristics under a high speed fading environment. Each of the detection circuits 4 and 5 detects a signal in view of the phase shift of the correlation value with respect to the transmission signal and outputs the detected signal as a demodulation signal. The detection circuits 4, 5 also output judging information for the selection of detection data to the detection output selection circuit 5.

The detection output selection circuit 6 outputs a selection signal to the selector 7 so as to select an output of a detection circuit which has provided better detection result comparing with judging information provided by each detection circuit. The selector 7 outputs a demodulation signal in accordance with the selection signal.

Figure 2:
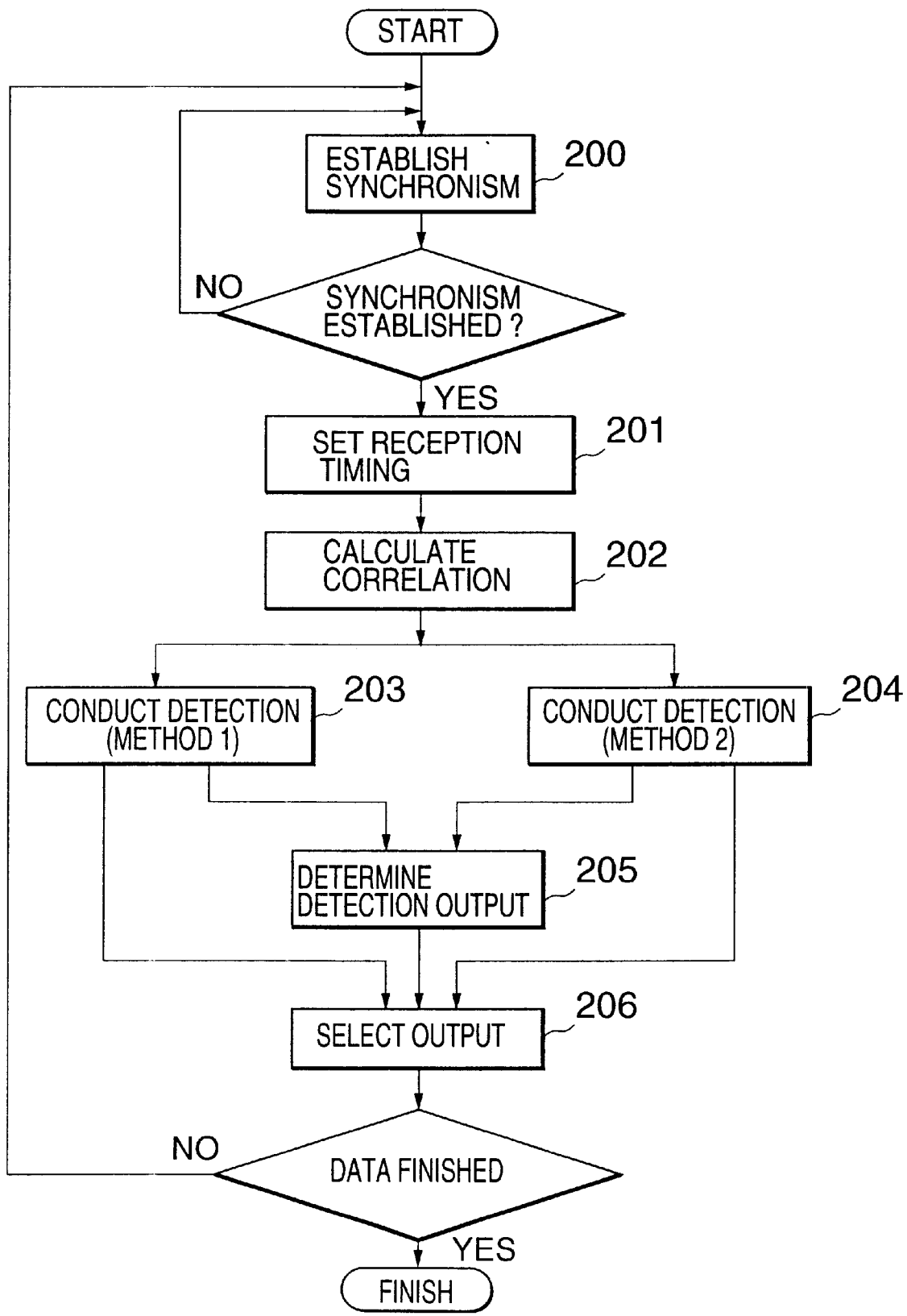
FIG. 2 is a flow chart for describing the operation of the embodiment of the present invention.

Next, the operation of this embodiment will be described in detail with reference to FIGS. 1 and 2. FIG. 2 is a flow chart for describing the operation of the embodiment shown in FIG. 1.

First, a series of input data is taken into the synchronism establishment circuit 1. The synchronism establishment circuit 1 performs the calculation of the correlation between a series of input data arriving at near timing, which it is an expected timing that the leading portion of transmission data exists, and a series of signals obtained by spreading a synchronism establishment signal using a transmission spread signal (in a step 200). If a correlation value exceeding a threshold value is detected, it is determined that the timing is one at which the series of data to be received being arrived, and a synchronization signal as the reception timing is provided the data buffer 2 and the correlator 3 (in a step 201).

The data buffer 2 and the correlator 3 start de-spread processing in accordance with the designated reception timing (in step 202).

The data buffer 2 provides a series of input data synchronous with the reception timing designated by the synchronization signal to the correlator 3. The correlator 3 de-spreads the reception data using a spread code synchronous with the reception timing, with the synchronization signal as a trigger, generates correlation value data in symbol units and outputs the correlation value data to the detection circuits 4, 5.

The detection circuits 4, 5 start detection processing with the synchronization signal as a trigger as in the case of the correlator 3 (in steps 203 and 204).

Figure 3:
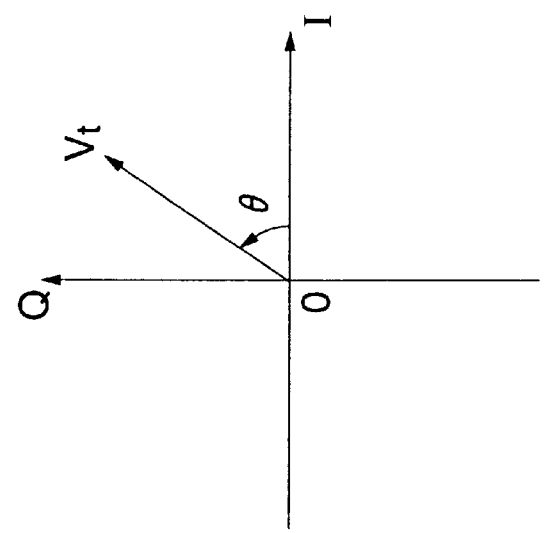
FIG. 3 is a view showing a specific example of the operation of a detection circuit of the present invention.
Figure 3:
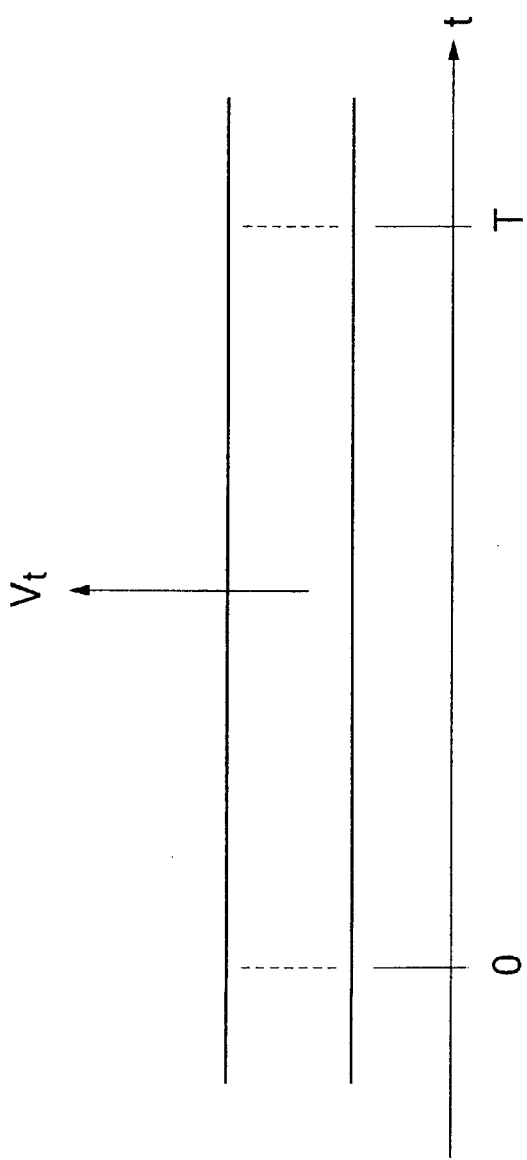

The detection circuit 4 estimates a phase shift value between a transmission signal and a reception signal using a series of synchronism establishment signals being interpolated so as to provide optimum detection characteristics under the low speed fading environment, and performs detection operation in consideration of the phase shift value to be compensated. Specifically, in FIG. 3, the detection circuit 4 calculates the average vector Vt of the phase shift estimated from the series of synchronism establishment signals of n symbols between time 0 and time T, and operates to reverse rotation with respect to the reception signal having the same time width by a phase θ. On a static transmission path or during low speed fading, the phase variation can be regarded as 0 in a certain time width. Under the same conditions, it is possible to estimate a phase shift value with high accuracy, in which an influence of white noise is reduced, using the average value obtained by adding the same phase.

Figure 4:
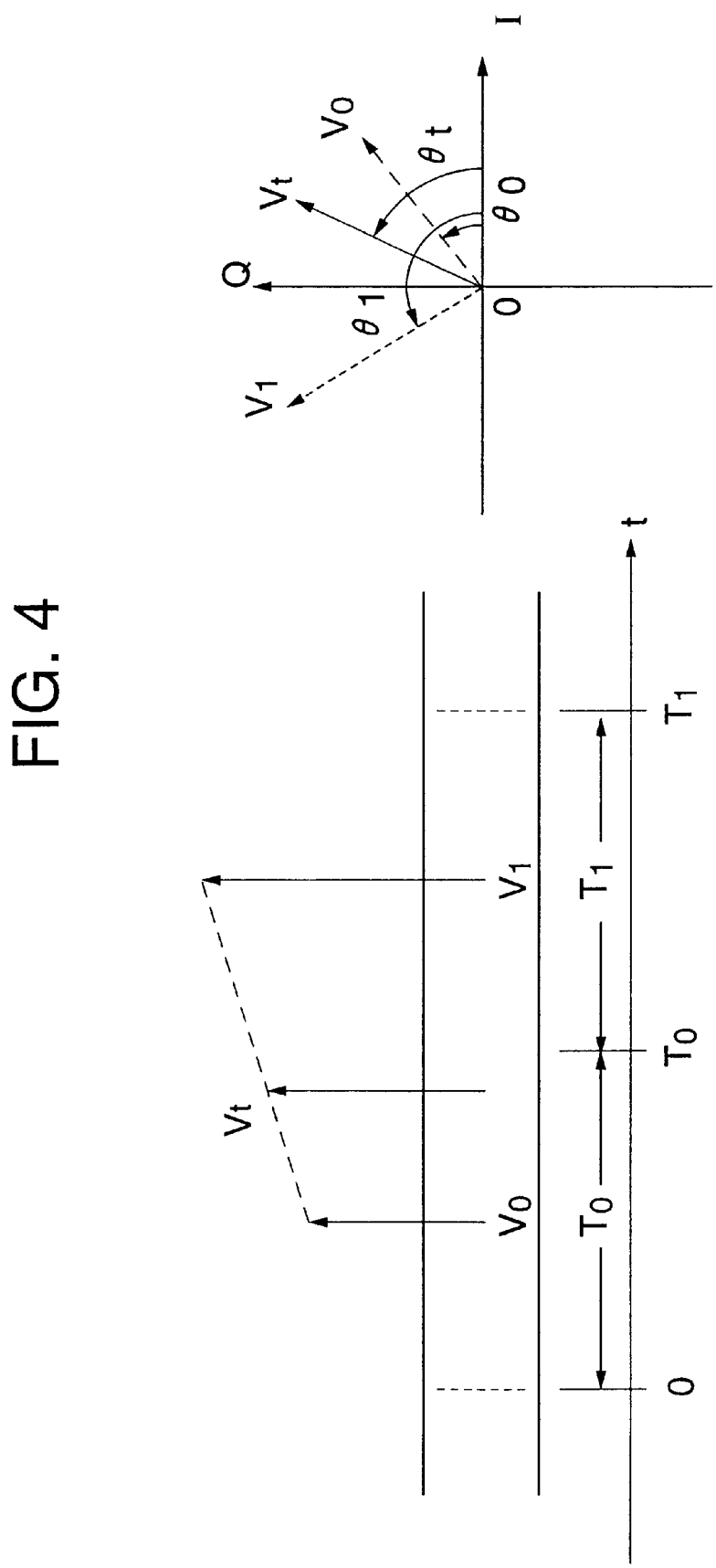
FIG. 4 is a view showing a specific example of the operation of another detection circuit of the present invention.

The detection circuit 5, as in the case of the detection circuit 4, estimates a phase shift value using the series of synchronism establishment signals so as to provide optimum detection characteristics under the high speed fading environment and performs detection operation. Specifically, in FIG. 4, the detection circuit 5 first calculates the average vector V0 of a phase shift value estimated from the series of synchronism establishment signals by n0 symbols between time 0 and time T0, and the average vector V1 of a phase shift value estimated from the series of synchronism establishment signals by n1 symbols between time T0 and time T1.

The estimated phase shift vector Vt between time t=T0/2 and time t=T0+T1/2 is calculated by performing primary linear interpolation to the vectors V0 and Vi. For example, the estimated vector Vt at time T0 is Vt=(V0+V1)/2. Using this estimated vector Vt, the detection circuit 5 operates to reverse rotation by a phase θt at time t. The variation at the time of high speed fading cannot be regarded as a constant phase variation even at a short time interval. Then, to reduce the influence of white noise, two estimated vectors are obtained from the averages at time widths T0 and T1 recognized as those having almost constant phase variation.

Next, using the weighted average between the two points, a phase shift compensation vector Vt at time t is obtained to thereby compensate for phase rotation. Here, T0 and T1 are determined by the trade-off between white noise reduction effect and phase variation speed.

The detection circuits 4, 5 output the detection signals detected based on the above method to the selector 7. Further, the ratio of average power to noise power of the phase shift estimated vector per one symbol of the series of synchronism establishment signals is provided to the detection output selection circuit 6.

The detection output selection circuit 6 outputs a selection signal to the selector 7 so as to output a detection signal which has performed better detection based on the above judging information (in a step 205).

The selector 7 outputs a detection signal based on the selection signal received from the detection output selection circuit 6 (in a step 206).

A series of the above decoding processings are continuously performed until the reception processing is finished.

Figure 5:
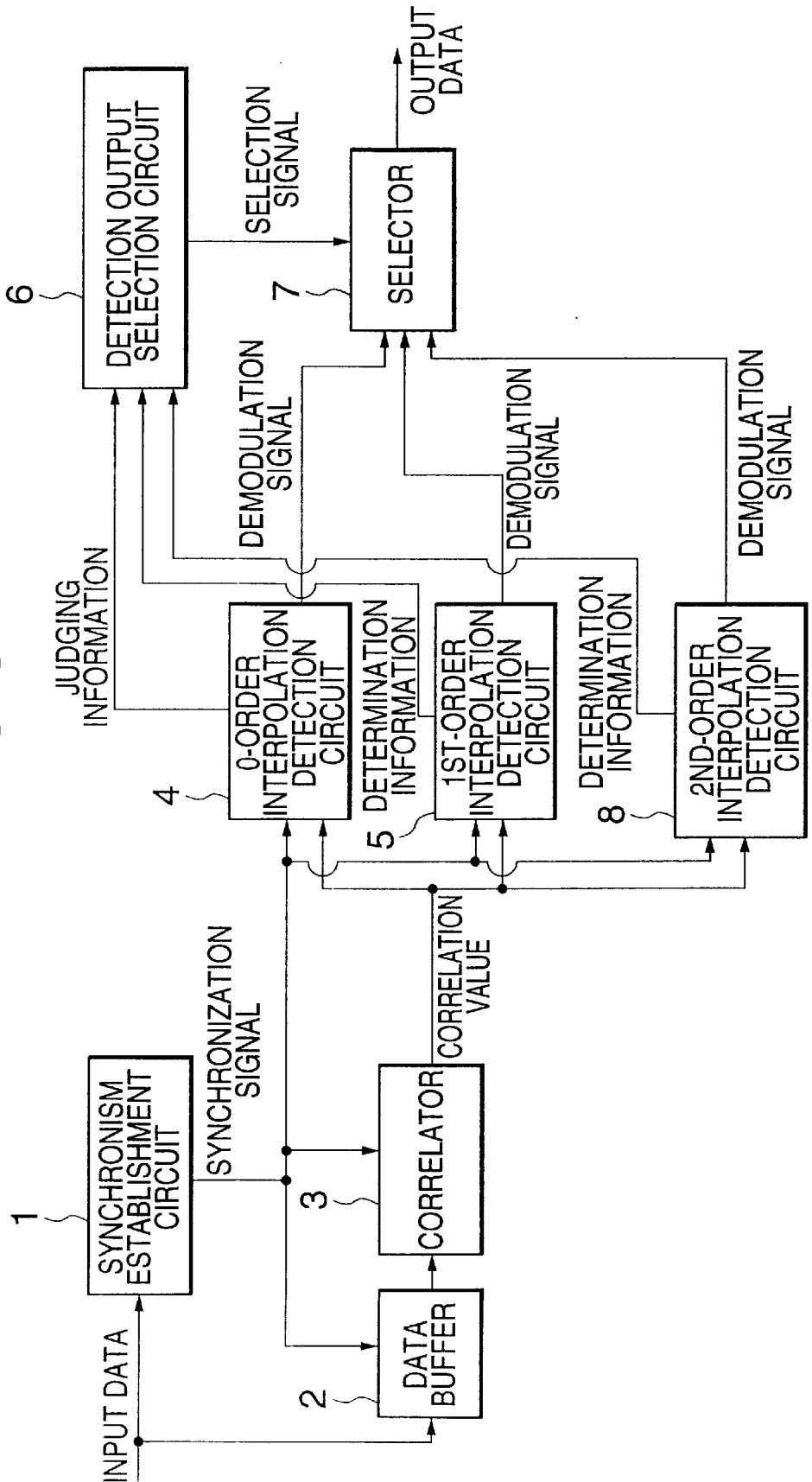
FIG. 5 is a block diagram showing another embodiment according to the present invention.

Next, as another embodiment of the present invention which has the same basic constitution as that described above, the circuit arrangement having "n" stages of detection circuits so as to deal with various transmission environments is shown in FIG. 5. FIG. 5 shows an example of the circuit arrangement in which the number of stages "n" is "n"=3.

In FIG. 5, a detection circuit 8 is newly added. The detection circuit 8 performs detection so as to estimate the phase shift between a transmission signal and a reception signal using a higher-order secondary vector interpolation than the detection circuit 5 and compensates for the phase rotation.

Figure 6:
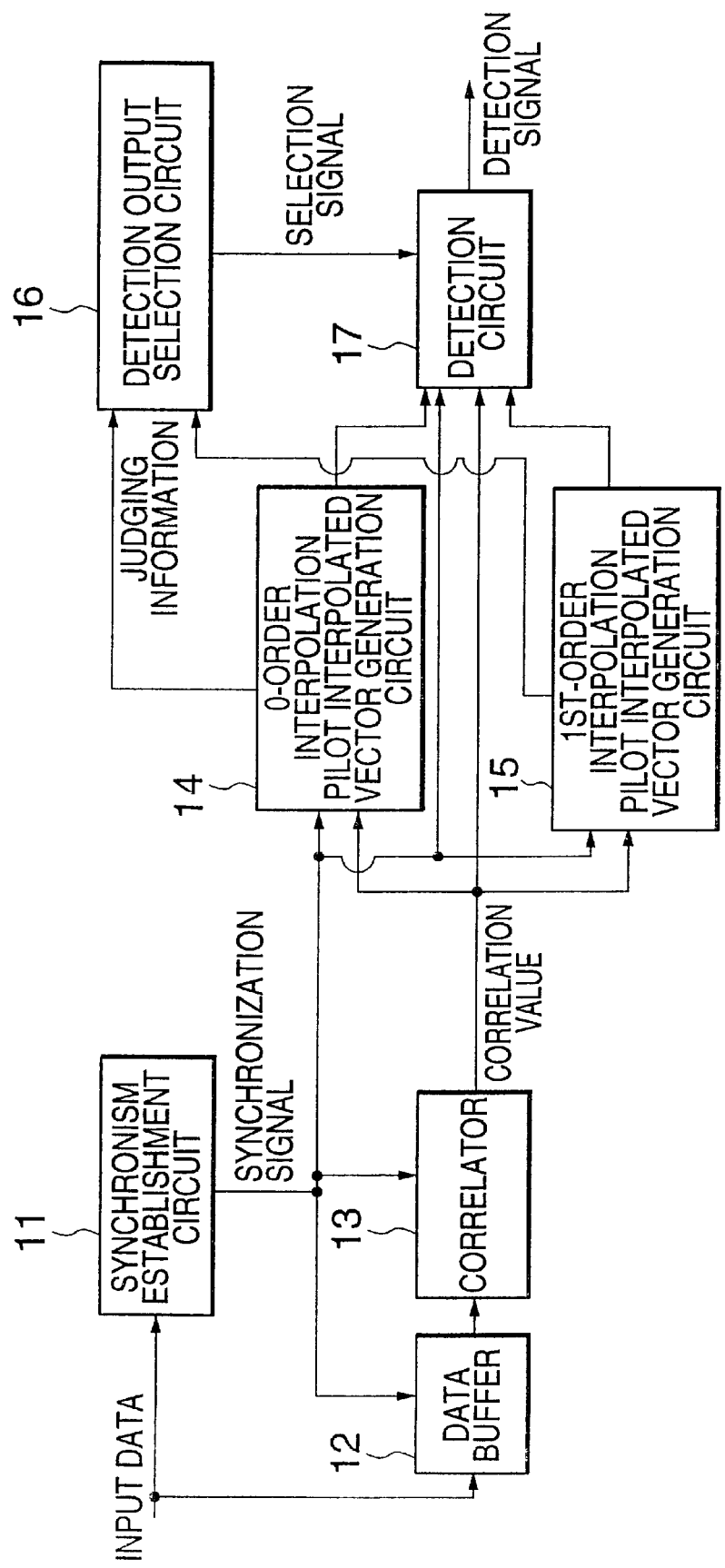
FIG. 6 is a block diagram showing yet another embodiment according to the present invention.
Figure 7:
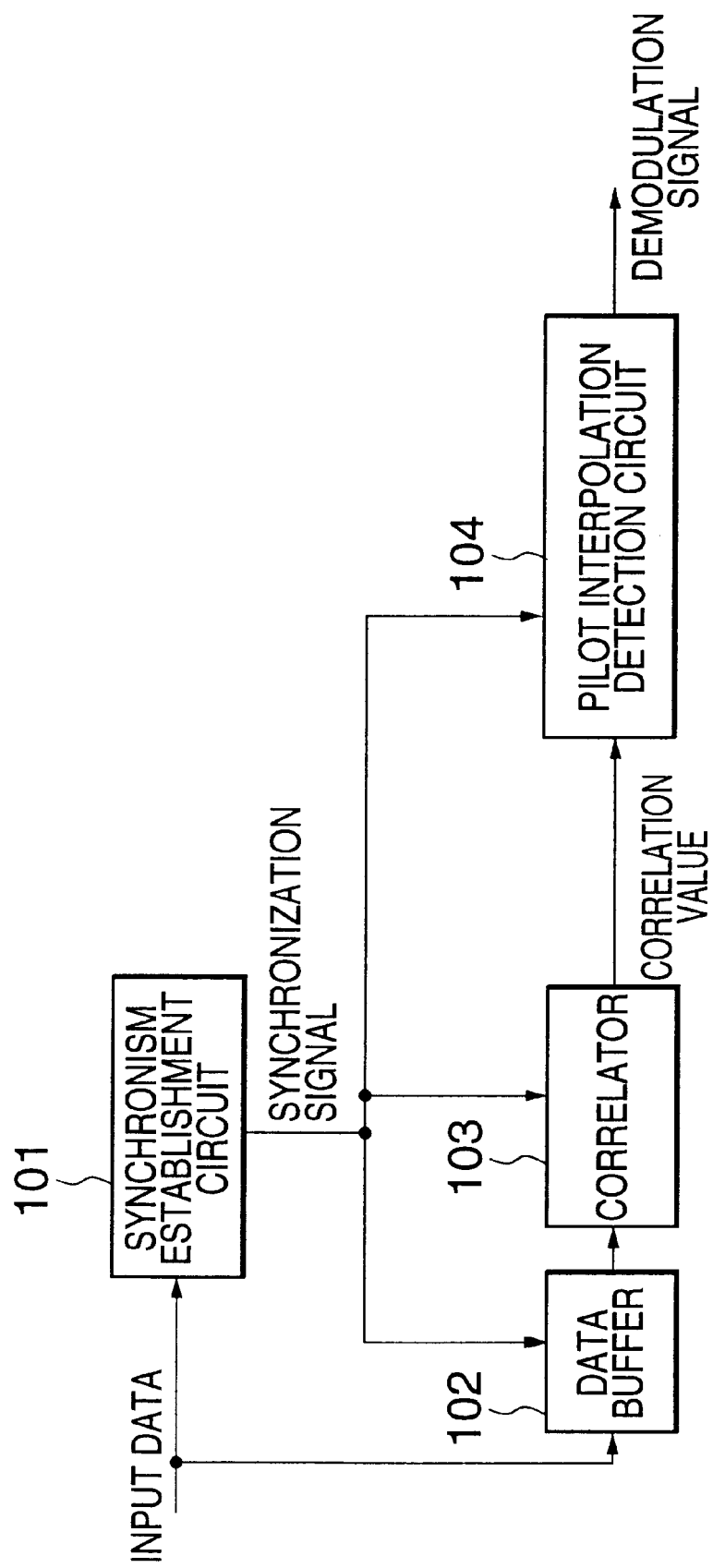
FIG. 7 is a block diagram showing a conventional receiving apparatus of spectrum spread communication system.

As yet another embodiment, FIG. 6 shows a constitution in which a detecting section and a phase shift vector generating section are separately provided, only a phase shift vector and the ratio of average power to noise power of a phase shift estimated vector per symbol of a series of synchronism establishment signals are calculated in advance to reduce operation amount. FIG. 6 shows an example of the circuit arrangement in which the number of detection circuits "n" is "n"=2.

In FIG. 6, each of the pilot interpolated vector generating parts 14 and 15 calculates a pilot interpolated phase shift vector by the above-stated interpolation method and outputs the vector to the detection circuit 17. At the same time, each of the pilot interpolated vector generating parts 14 and 15 calculates the ratio of vector power to noise per symbol of a series of synchronism establishment signals and outputs the ratio to the detection output selection circuit 16.

The detection output selection circuit 16 selects a better interpolation method from the received power to noise ratio and outputs a selection signal to the detection circuit 17.

The detection circuit 17 performs detection processing to a reception signal data section using the vector of the interpolation method designated by the selection signal and outputs the vector as a detection signal.

As a result, the receiving apparatus of spectrum spread communication system shown in FIG. 6 can be constituted to have only one detection circuit while obtaining the equivalent detection characteristics to those of the receiving apparatus of spectrum spread communication system shown in FIG. 1.

In this embodiment, as the number of pilot interpolated vector generating circuits increases, the greater effect of reducing the operation amount of the entire apparatus can be obtained.

As stated so far, the present invention has a plurality of detection circuits corresponding to a plurality of fading pitches. By selecting the detection output, it is possible to follow up the variation of the fading pitch at high speed. Thus, even if the fading pitch is varied, it is possible to obtain good reception characteristics.

What is claimed is:

1. A receiving apparatus of spectrum spread communication system used in a code division multiple access system, said receiving apparatus comprising:

a plurality of detection circuits, which detect a receiving signal respectively by using a plurality of different vector interpolation methods;

a detection output selection circuits, which determines one of detection circuits performing better detection result than others; and a selector, which selects output signals from the detection circuit determined by the detection output selection circuit as output signals of the receiving apparatus.

2. The receiving apparatus according to claim 1, wherein said plurality of detection circuits include:

a first detection circuit which performs a zero-th order vector interpolation; and a second detection circuit which performs a first order vector interpolation.

3. A receiving apparatus of spectrum spread communication system used in a code division multiple access system, said receiving apparatus comprising:

a plurality of detection circuits, which detect a receiving signal respectively by using a plurality of different vector interpolation methods, and which respectively output a judging signal indicating the detection results having being detected and detected signals;

a detection output selection circuit, which determines one of detection circuits performing better detecting result than others by comparing the judging signal from each detection circuit, and outputs a selection signal indicating the detection circuit from which output signals are to be selected as output signals of the receiving apparatus; and a selector, which selects output signals from the detection circuit indicated by the selection signal for providing output signals of the receiving apparatus.

4. The receiving apparatus according to claim 3, wherein said plurality of detection circuits include:

a first detection circuit which performs a zero-th order vector interpolation; and a second detection circuit which performs a first order vector interpolation.

5. The receiving apparatus according to the claim 3, wherein said judging signal is a ratio of average power to noise power of a phase shift estimated vector per one symbol of the series of synchronism establishment signals.

6. A receiving apparatus of spectrum spread communication system used in a code division multiple access system, said receiving apparatus comprising:

a synchronism establishment circuit, which correlates a series of input data to a series of signals obtained by spreading a series of synchronism establishment signals using a spread code, and outputs a synchronization signal;

a data buffer, which stores the series of input data and outputs the input data synchronous with the synchronization signal;

a correlator, which performs a correlation calculation between a reception signal from the data buffer and the spread code synchronously with the synchronization signal, and outputs a correlation value;

a plurality of detection circuits, each has optimum detection characteristics of receiving signals under different fading pitches, compensates receiving signals in consideration of a phase shift based on the correlation value and the synchronization signal, and outputs a judging signal indicating the detection result having being detected and detected signals as demodulation signals;

a detection output selection circuit, which outputs a selection signal indicating one of the detection circuits performing better detection result than others by comparing the judging signal from each detection circuit; and a selector, which selects demodulation signals from the detection circuit indicated by the selection signal, and outputs the demodulation signals as output signals of the receiving apparatus.

7. The receiving apparatus according to claim 6, wherein said judging signal is a ratio of average power to noise power of the phase shift estimated vector per one symbol of the series of synchronism establishment signals.

8. A receiving apparatus of spectrum spread communication system used in a code division multiple access system, said receiving apparatus comprising:

a synchronism establishment circuit, which correlates a series of input data to a series of signals obtained by spreading a series of synchronism establishment signals using a spread code, and outputs a synchronization signal;

a data buffer, which stores the series of input data and outputs the input data synchronous with the synchronization signal;

a correlator, which performs a correlation calculation between a reception signal from the data buffer and the spread code synchronously with the synchronization signal, and outputs a correlation value;

a first detection circuit, which has optimum detection characteristics of receiving signals under a low speed fading pitch, compensates receiving signals in consideration of a phase shift based on the correlation value and the synchronization signal, and outputs a first judging signal indicating the detection result having being detected and first detected signals as demodulation signals;

a second detection circuit, which has optimum detection characteristics of receiving signals under a high speed fading pitch, compensates receiving signals in consideration of a phase shift based on the correlation value and the synchronization signal, and outputs a second judging signal indicating the detection result having being detected and second detected signals as demodulation signals;

a detection output selection circuit, which outputs a selection signal indicating one of the first detection circuit and the second detection circuit performing better detection result than other by comparing the first judging signal and the second judging signal; and a selector, which selects demodulation signals from one of the first detection circuit and the second detection circuit indicated by the selection signal, and outputs the demodulation signals as output signals of the receiving apparatus.

9. The receiving apparatus according to claim 8, wherein said judging signal is a ratio of average power to noise power of the phase shift estimated vector per one symbol of the series of synchronism establishment signals.

10. A receiving apparatus of spectrum spread communication system used in a code division multiple access system, said receiving apparatus comprising:

a synchronism establishment circuit, which correlates a series of input data to a series of signals obtained by spreading a series of synchronism establishment signals using a spread code, and outputs a synchronization signal;

a data buffer, which stores the series of input data and outputs the input data synchronous with the synchronization signal;

a correlator, which performs a correlation calculation between a reception signal from the data buffer and the spread code synchronously with the synchronization signal, and outputs a correlation value;

a plurality of phase shift vector generating sections, each has optimum calculation characteristics of receiving signals under different fading pitches, calculates a phase shift vector of receiving signals based on the correlation value and the synchronization signal, and outputs the calculated phase shift vector of receiving signals and a judging signal indicating a ratio of average power to noise power of the phase shift estimated vector per one symbol of the series of synchronism establishment signals;

a detection output selection circuit, which outputs a selection signal indicating one of the phase shift vector generating sections being considered obtaining a better result of calculation than others by comparing the judging signal from each phase shift vector generating section; and a detection circuit, which selects the phase shift vector of receiving signals from the phase shift vector generating section indicated by the selection signal, performs detection operation of receiving signals by using the phase shift vector of receiving signals and the synchronization signal, and outputs signals being detected as output signals of the receiving apparatus.

* * * * *